United States Patent [19]

Sugimoto et al.

[11] Patent Number: 5,348,920

[45] Date of Patent: Sep. 20, 1994

[54] θ-ALUMINA POWDER, PREPARATION THEREOF AND MAGNETIC RECORDING MEDIUM

[75] Inventors: Shoji Sugimoto; Yoshiaki Takeuchi; Hiroshi Umezaki, all of Niihama, Japan

[73] Assignee: Sumitomo Chemical Company, Limited, Osaka, Japan

[21] Appl. No.: 135,549

[22] Filed: Oct. 14, 1993

Related U.S. Application Data

[62] Division of Ser. No. 909,208, Jul. 6, 1992, abandoned.

[30] Foreign Application Priority Data

Jul. 8, 1991 [JP] Japan .................. 3-166568

[51] Int. Cl.$^5$ ............................. C04B 35/10
[52] U.S. Cl. ................... 501/153; 501/127; 51/309; 423/625; 423/629
[58] Field of Search ............ 51/309; 501/127, 153; 423/600, 625, 629

[56] References Cited

U.S. PATENT DOCUMENTS 3,714,343  1/1973  Sato et al. .
4,731,278  3/1988  Ryoke et al. .................. 428/141

FOREIGN PATENT DOCUMENTS 54-103308  8/1979  Japan .
2-128319   5/1990  Japan .

OTHER PUBLICATIONS

Chemical Abstracts, vol. 84, 1976, Columbus, Ohio, US; Abstract No. 19875v (no month).
Chemical Abstracts, vol. 73, 1970, Columbus, Ohio, US; Abstract No. 102725q (no month).
Chemical Abstracts, vol. 82, Mar. 24, 1975, Columbus, Ohio, US; Abstract No. 75042s.
Electrochemistry, 28, 302–312 and 358–364 (1960) (with partial translation) (no month).
Jounral of Mineralogy, 19, (1), 21 (1989) (no month).
Scientific Articles of Japan Ceramics Society, 99, (7) 550–555, 1991, received Nov. 5, 1990.

Primary Examiner—Karl Group
Attorney, Agent, or Firm—Birch, Stewart, Kolasch & Birch

[57] ABSTRACT

Alumina powder having a θ-alumina content of at least 70% by weight and an average primary particle size at least 0.1 μm and containing a tungsten compound in an amount of 0.1 to 5% by weight in terms of tungsten oxide based on alumina can be used as an abrasive for a magnetic recording medium having good properties.

8 Claims, No Drawings

θ-ALUMINA POWDER, PREPARATION THEREOF AND MAGNETIC RECORDING MEDIUM

This application is a divisional of copending application Ser. No. 07/909,208, filed on Jul. 6, 1992, now abandoned, the entire contents of which are hereby incorporated by reference.

BACKGROUND OF THE INVENTION

1. Field of the Invention

The present invention relates to θ-alumina powder, a method for preparing the θ-alumina powder, and a magnetic recording medium comprising the θ-alumina powder as an abrasive.

2. Description of Related Art

Generally, a magnetic recording medium for an audio, video and computer has a layer made of a magnetic paint which is prepared by dispersing a magnetic material such as ferromagnetic metal oxides or metal powder in a binder and coated on a non-magnetic substrate. Since the magnetic recording medium is used with contacting while being contacted to a magnetic head, the magnetic layer should have a sufficient travel property and durability.

When the durability is insufficient, particles dropping from the magnetic layer adhere around the magnetic head to prevent a smooth contact of the magnetic layer with the magnetic head. Accordingly, an electromagnetic conversion property is deteriorated, a drop out arises and a tape is significantly contaminated during still reproduction. When the travel is insufficient, friction of the tape varies to deteriorate the travel property.

Hitherto, inorganic powder such as alumina, silicon carbide, chromium oxide, titanium oxide, silicon oxide and α-iron oxide has been added as an abrasive to the magnetic layer so as to improve the travel property and durability of the magnetic layer.

Alumina which is often used as the abrasive is predominantly α-alumina. It is known that aluminum hydroxide such as gibbsite, bayerite and boehmite can be converted to intermediate alumina and then α-alumina by heating as follows: χ→κ→α, γ→δ→θ→α, η→θ→α, ρ→η→θ→α, pseudo γ→θ→α alumina (cf. for example, "Electrochemistry" (Japan), Vol. 28, page 302 by Funaki and Simizu; On alumina hydrate and alumina, Table 1, Examples of thermal change of alumina hydrate).

It is also known that amorphous alumina can be converted through intermediate alumina such as γ, β and θ-alumina to α-alumina by pyrolysis of an aluminum salt such as aluminum chloride, aluminum sulfate and aluminum nitrate (cf. for example, "Mineralogy Journal" (Japan), Vol. 19, No. 1, page 21 and 41).

The conversion from intermediate alumina to α-alumina is an exothermic reaction, and the grain growth of α-alumina is faster than that of intermediate alumina. α-Alumina used as the abrasive for the magnetic recording medium has a high Mohs hardness of 9 to contribute the improved travel property and durability of the magnetic layer. However, it is impossible to prevent incorporation of the coarse particles prepared by the grain growth curing the phase transition into α-phase, so that the coarse particles deteriorate a tape surface smoothness, scratch the magnetic head during the travel, and prevent a smooth contact with the magnetic head to deteriorate the electromagnetic conversion property.

SUMMARY OF THE INVENTION

An object of the present invention is to provide alumina powder used as an abrasive which can give a magnetic recording medium having good tape surface smoothness, good travel durability, a good electromagnetic conversion property and decreased damage of a magnetic head.

Another object of the present invention is provide a method for preparing said alumina powder.

Further object of the present invention is provide a magnetic recording medium comprising said alumina powder.

The present invention relates to θ-alumina powder having a θ-alumina content of at least 70% by weight and an average primary particle size of at least 0.1 μm and containing a tungsten compound in an amount of 0.1 to 5% by weight in terms of tungsten oxide based on alumina.

The present invention also relates to a method for preparing θ-alumina powder which comprises calcining, at a temperature of 1100° to 1300° C., an aluminum compound containing tungsten or a tungsten compound in an amount of 0.1 to 5% by weight in terms of tungsten oxide based on alumina after calcination to obtain alumina powder having a θ-alumina content of at least 70% by weight and an average primary particle size of at least 0.1 μm and containing a tungsten compound in an amount of 0.1 to 5% by weight in terms of tungsten oxide based on alumina.

The present invention further relates to a magnetic recording medium comprising a magnetic layer containing a magnetic material, a binder and an abrasive on a non-magnetic substrate, the abrasive being θ-alumina powder having a θ-alumina content of at least 70% by weight and an average primary particle size of 0.1 to 0.5 μm.

DETAILED DESCRIPTION OF THE INVENTION

The alumina powder according to the present invention has an alumina crystalline phase at least 70%, preferably at least 80% of which is θ-phase and an average primary particle size of at least 0.1 μm.

The alumina powder having the crystalline θ-phase is known. Commercially produced θ-alumina powder has an average primary particle size of at most 0.03 μm. When it is intended to obtain the powder having the size of more than 0.03 μm by thermal grain growth, the powder is quickly converted to α-alumina. Accordingly, no alumina powder having the average primary particle size of at least 0.1 μm and substantially consisting of θ-alumina prepared by thermal grain growth has been known.

When θ-alumina is used as the abrasive for the magnetic recording medium, a sufficient head cleaning effect is achieved since the hardness of θ-alumina is larger than the hardness of silicon oxide, titanium oxide and α-iron oxide conventionally used as the abrasive, and a scratch on the magnetic head is decreased due to lower hardness than α-alumina.

The θ-alumina powder used as the abrasive has the average primary particle size of at least 0.1 μm, preferably from 0.1 to 0.5 μm, more preferably from 0.12 to 0.3 μm. A method for preparing the θ-alumina powder is not specifically limited, and a specific example of the preparation is as follows:

The θ-alumina can be prepared by calcining, at a temperature of from 1100° to 1300° C. for a time of from 10 minutes to 48 hours, preferably at a temperature of from 1150° to 1250° C. for a time of from 30 minutes to 24 hours, an aluminum compound raw material containing a tungsten compound in an amount of from 0.1 to 5% by weight, preferably from 1 to 3% by weight in terms of tungsten oxide based on alumina after calcination.

The crystalline state of the resultant alumina powder drastically varies depending on the calcination temperature and time as well as the aluminum compound raw material and the kind and amount of the tungsten compound, it is recommendable to determine the calcination conditions on the basis of a simple preliminary experiment after selecting the raw material.

The θ-alumina powder having a large size (for example, more than 0.2 μm) can be easily obtained, when the calcination is performed in the presence of $H_2O$ vapor, for example, in a gas-firing furnace.

A method for incorporating tungsten or the tungsten compound in the aluminum compound raw material is not limited, and tungsten or the tungsten compound is substantially homogeneously dispersed in the aluminum compound raw material. For example, tungsten or the tungsten compound is added to a solution containing an aluminum halide such as aluminum chloride or an aluminum salt such as aluminum sulfate, aluminum nitrate, aluminum perchlorate and aluminum alum in an amount of from 0.1 to 5% by weight in terms of tungsten oxide based on alumina after calcination, intimately mixed and then neutralized, recrystallized or precipitated in the form of a carbonate salt by ammonium hydrogencarbonate and the like to prepare the aluminum compound, which is then calcined.

In another method, tungsten or the tungsten compound is added to a solution containing an organic aluminum compound, for example, an aluminum alkoxide such as aluminum methoxide, aluminum ethoxide and aluminum isopropoxide, an alkylaluminum such as trimethylaluminum and triethylaluminum, an aluminum carboxylate salt or an aluminum dicarboxylate salt in an amount of from 0.1 to 5% by weight in terms of tungsten oxide based on alumina after calcination, intimately mixed, and subjected to hydrolysis to prepare the aluminum compound, which is then calcined.

In a further method, tungsten or the tungsten compound is added to an aluminum-containing compound prepared by neutralizing, recrystallizing or precipitating (in the form of a carbonate salt by ammonium hydrogen-carbonate) only the above aluminum salt, or an aluminum-containing compound prepared by subjecting only the above organic aluminum compound to hydrolysis or pyrolysis in an amount of from 0.1 to 5% by weight in terms of tungsten oxide based on aluminum after calcination, and mixed in a dry or wet state to prepare a mixture, which is then calcined.

It is preferable to use aluminum hydroxide having an average primary particle size of at most 0.05 μm and prepared by the hydrolysis of the organic aluminum compound.

When the amount of tungsten or the tungsten compound is outside the above range, it is impossible to prepare the desired θ-alumina powder having a large average primary particle size.

The tungsten compound used as the raw material is not limited insofar as it can be homogeneously dispersed in or mixed with the aluminum compound raw material.

Specific examples of the tungsten compound are an ammonium tungstate salt such as ammonium metatungstate and ammonium paratungstate, a tungsten halide such as tungsten chloride and a tungsten oxyhalide such as tungsten oxychloride.

The magnetic recording medium according to the present invention is characterized in that the θ-alumina powder having the average primary particle size of 0.1 to 0.5 μm and the θ-alumina content of at least 70% by weight is used as the abrasive.

When the average primary particle size observed by a TEM (transmission electron microscope) is smaller than 0.1 μm, a reinforcement effect is low and travel durability is low. When it is larger than 0.5 μm, magnetic properties are low and the magnetic head may be scratched to deteriorate an electromagnetic conversion property. When the θ-alumina content is smaller than 70% by weight (namely the α-alumina content is larger than 30% by weight), surface smoothness of the tape is low and the magnetic head may be scratched during the travel.

In the magnetic recording medium according to the present invention, an addition amount of the alumina powder is generally from 1 to 20 parts by weight, preferably from 1 to 15 parts by weight per 100 parts by weight of the magnetic material. When the amount is larger than 20 parts by weight, the tape surface smoothness and the magnetic properties are low and the magnetic head may be scratched. When the amount is smaller than 1 part by weight, the reinforcement effect is insufficient and the travel durability is low.

The magnetic material may be a conventional one. Specific examples of the magnetic material are oxide magnetic materials such as $\gamma$-$Fe_2O_3$, Co-containing $\gamma$-$Fe_2O_3$, Co-coated $\gamma$-$Fe_2O_3$, $Fe_3O_4$, Co-containing $\gamma$-$Fe_3O_4$, Co-coated $\gamma$-$Fe_3O_4$ and $CrO_2$, metal magnetic powder materials based on Fe, Ni or Co such as Fe, Ni, Co, an Fe-Ni alloy, an Fe-Co alloy, an Fe-Ni-P alloy, an Fe-Ni-Co alloy, an Fe-Mn-Zn alloy, an Fe-Ni-Zn alloy, an Fe-Co-Ni-Cr alloy, an Fe-Co-Ni-P alloy, a Co-Ni alloy, a Co-P alloy and a Co-Cr alloy.

A particle size (average primary particle size) of the magnetic material is not limited, but is preferably from about 0.05 to about 5 μm.

A additive for the metal magnetic material may be used as in the prior arts and may be an element such as Si, Cu, Zn, Al, P, Mn and Cr and a compound comprising said element.

The magnetic material may contain hexagonal system ferrite such barium ferrite, iron nitride and iron carbide.

The binder used for the magnetic layer according to the present invention is a conventional one used for the magnetic recording medium. The binder may be thermoplastic resins, thermosetting resins, reactive resins and radiation (such as an electron beam) curing resins.

Specific examples of the binder are urethane resins, vinyl chloride resins, epoxy resins, urea resins, amide resins, silicone resins, polyester resins, phenol resins, vinyl resins, cellulose derivative resins and rubberic resins. The resins may be a homopolymer or copolymer and may be used individually or in mixture.

Specific examples of the material for the non-magnetic substrate are plastics, for example, polyesters such as polyethylene terephthalate and polyethylene naphthalate, polyolefins such as polypropylene, cellulose derivatives such as cellulose triacetate and cellulose diacetate, polyvinyl chloride resins, polycarbonates, polyamides and polysulfones as well as metals such as copper and ceramics such as glass.

A method for preparing the magnetic recording medium according to the present invention may be a conventional one and is not limited. The magnetic recording medium can be prepared by mixing and dispersing the magnetic material, the binder, the abrasive and optional additives in an organic solvent to prepare a magnetic paint, coating the magnetic paint on the non-magnetic substrate, drying and optionally thermally treating the paint and then conducting a thermal or surface treatment. The magnetic layer of the magnetic recording medium according to the present invention generally has a thickness of 0.5 to 20 μm.

In addition to the abrasive for the magnetic recording medium, the θ-alumina powder according to the present invention can be used also as an additive for a back coating of magnetic recording mediums, and as a filler for paints, PET films and various fibers.

PREFERRED EMBODIMENTS OF THE INVENTION

The present invention will be illustrated by the following Examples which do not limit the present invention.

Properties are measured as follows:

Squareness ratio:

A squareness ratio is measured at a sweep magnetic field of 15 K Gauss by a vibratory flux meter (BHV-50 manufactured by Riken Denshi).

Surface gloss:

Total refrectance at an incident angle of 60° and a reflective angle of 60° in a longitudinal direction of a sample tape is measured by means of a standard gloss meter, and a relative value thereof is determined by setting a specular glossiness to 100 at an incident angle of 60° in a glass having a refractive index of 1.56 according to JIS Z 8741.

Still characteristic:

Using a video deck modified for still measurement, 4 MHz signals are recorded in a sample tape. When the signals are reproduced in the still state at 25° C. and 60% RH under a back tension of 40 g, a time required for decreasing a reproducing output to a half is measured.

Head deposition and head abrasion amount:

When a sample tape is traveled for 100 hours at 40° C. and 80% RH using a video deck NV-G21 manufactured by Matsushita, a deposit state on a magnetic head is observed and an abrasion amount of the head is measured.

Average primary particle size:

Particle sizes are read from TEM (transmission electron microscope) and converted to a weight base to prepare a cumulative frequency distribution curve and then the average primary particle size is determined.

BET specific surface area:

Using a directly reading-type specific surface area meter manufactured by Quantachrome, a $N_2$ gas is absorbed and desorbed in a $N_2$—He carrier gas and a $N_2$ desorption amount is measured by a thermal conductivity detector to determine a specific surface area.

θ-Alumina content:

X-ray intensity of a sample is measured, and a diffraction intensity in a plane index of θ-alumina is compared with a diffraction intensity of a standard sample (a X-ray intensity of a 1:1 mixture of θ-alumina and α-alumina is regarded as 50) which is simultaneously measured to show the θ-alumina content in % through the intensity ratio.

EXAMPLE 1

On aluminum hydroxide having an average primary particle size of 0.01 μm which was prepared by hydrolysis of aluminum isopropoxide, a solution of ammonium metatungstate was sprayed in an amount of 2% by weight in terms of tungsten oxide based on alumina after calcination. The sprayed material was homogeneously mixed, charged in a thermal resistant alumina crucible and then calcined in a gas firing furnace at 1230° C. for 3 hours.

After cooling, the resultant alumina powder had an average primary particle size of 0.2 μm. θ-Alumina constituted 89% of a crystalline phase of the alumina powder according to a X-ray diffraction, the balance being α-alumina.

Five parts by weight of the resultant alumina powder was used to prepare a magnetic paint having the following composition:

| | |
|---|---|
| Co-coated γ-iron oxide | 100 parts by weight |
| Polyurethane resin | 10 parts by weight |
| Viny chloride/vinyl acetate copolymer | 10 parts by weight |
| Carbon | 2 parts by weight |
| Lubricant (butyl stearate) | 1 part by weight |
| Curing agent (polyisocyanate) | 2 parts by weight |
| Solvent | |
| Methyl ethyl ketone | 100 parts by weight |
| Toluene | 100 parts by weight |
| Cyclohexanone | 50 parts by weight |

After the above composition was dispersed for 5 hours in a sand mill and filtered through a filter having an average pore size of 5 μm, it was coated on a polyethylene terephthalate film having a thickness of 14 μm and dried to form a dried magnetic layer having a thickness of 3 μm. After calendering, the film was cured at 70° C. for 24 hours. Then, the film was cut in a width of ½ inch to prepare a magnetic tape.

The surface gloss of the magnetic tape, the still characteristic, the deposit amount on the head and the head abrasion amount were measured. The results are shown in Table 2.

EXAMPLE 2 AND COMPARATIVE EXAMPLES 1 TO 6

Magnetic tapes were prepared in the same manner as in Example 1 except that the tungsten oxide content and calcination conditions were changed to prepare alumina powder having properties shown in Table 1 which was then used (In Comparative Example 3, commercial alumina powder ($Al_2O_3$-manufactured by Degussa (Germany)) was used).

The surface gloss of the magnetic tape, the still characteristic, the deposit amount on the head and the head abrasion amount were measured. The results are shown in Table 2.

EXAMPLE 3

To a solution of ammonium alum in water, ammonium metatungstate was added in an amount of 4% by weight in terms of tungsten oxide based on alumina after calcination. The mixture was intimately mixed. Tungsten-containing ammonium alum was precipitated by recrystallization and then calcined in a gas firing furnace at 1230° C. for 3 hours to prepare θ-alumina powder having properties shown in Table 1. The θ-alumina powder was used to prepare a magnetic tape in the same manner as in Example 1.

The surface gloss of the magnetic tape, the still characteristic, the deposit amount on the head and the head abrasion amount were measured. The results are shown in Table 2.

EXAMPLE 4

To a solution of aluminum isopropoxide in isopropyl alcohol, tungsten methoxide was added in an amount of 1% by weight in terms of tungsten oxide based on alumina after calcination. The mixture was intimately mixed. Tungsten-containing aluminum hydroxide was produced by hydrolysis and then calcined in a gas firing furnace at 1170° C. for 3 hours to prepare θ-alumina powder having properties shown in Table 1. The θ-alumina powder was used to prepare a magnetic tape in the same manner as in Example 1.

The surface gloss of the magnetic tape, the still characteristic, the deposit amount on the head and the head abrasion amount were measure. The results are shown in Table 2.

TABLE 1

| | Preparation conditions | | Properties of alumina powder | | |
|---|---|---|---|---|---|
| Example No. | Tungsten oxide content (wt %) | Calcination condition (temperature × hr.) | Main crystalline phase | θ-Alumina content (%) | Average primary particle size (μm) |
| 1 | 2.0 | 1230° C. × 3 | θ >> α | 89 | 0.22 |
| 2 | 2.0 | 1280° C. × 3 | θ >> α | 75 | 0.30 |
| 3 | 4.0 | 1230° C. × 3 | θ >> α | 85 | 0.23 |
| 4 | 1.0 | 1170° C. × 3 | θ >> α | 92 | 0.12 |
| Com. 1 | 2.0 | 1150° C. × 3 | θ | 100 | 0.01 |
| Com. 2 | 2.0 | 1170° C. × 3 | θ | 100 | 0.05 |
| Com. 3 | Al$_2$O$_3$—C (trade name) | | δ | 0 | 0.01 |
| Com. 4 | 0 | 1280° C. × 3 | α >> θ | 10 | 0.42 |
| Com. 5 | 1.0 | 1250° C. × 3 | α >> θ | 10 | 0.21 |
| Com. 6 | 0 | 1100° C. × 3 | θ >> α | 80 | 0.02 |

TABLE 2

| | Properties of tape | | | | |
|---|---|---|---|---|---|
| Example No. | Surface gloss (%) | Squareness ratio | Still characteristic (min.) | Head deposition | Head abrasion amount (μm/100 hr) |
| 1 | 150 | 0.82 | >90 | Good | 4 |
| 2 | 145 | 0.80 | >90 | Good | 4 |
| 3 | 148 | 0.81 | >90 | Good | 5 |
| 4 | 147 | 0.80 | >90 | Good | 4 |
| Com. 1 | 130 | 0.78 | 60 | Bad | 2 |
| Com. 2 | 137 | 0.79 | 70 | Bad | 3 |
| Com. 3 | 135 | 0.79 | 60 | Bad | 2 |
| Com. 4 | 138 | 0.80 | >90 | Good | 10 |
| Com. 5 | 138 | 0.81 | >90 | Good | 4 |
| Com. 6 | 135 | 0.78 | 30 | Bad | 2 |

When the alumina powder according to the present invention is used as an abrasive for a magnetic recording medium, the magnetic recording medium has good durability, magnetic properties and surface smoothness of a magnetic layer, a good cleaning effect on a magnetic head and a good prevention effect for magnetic head abrasion.

What is claimed is:

1. θ-Alumina powder having a θ-alumina content of at least 70% by weight and an average primary particle size of at least 0.1 μm and containing a tungsten compound in an amount of 0.1 to 5% by weight in terms of tungsten oxide based on alumina.

2. The powder according to claim 1, wherein the average primary particle size is from 0.1 to 0.5 μm.

3. A method for preparing θ-alumina powder which comprises calcining, at a temperature of 1100° to 1300° C., an aluminum compound containing tungsten or a tungsten compound in an amount which of 0.1 to 5% by weight in terms of tungsten oxide based on alumina after calcination to obtain alumina powder having a θ-alumina content of at least 70% by weight and an average primary particle size of at least 0.1 μm and containing a tungsten compound in an amount of 0.1 to 5% by weight in terms of tungsten oxide based on alumina.

4. The method according to claim 3, wherein a calcination time is from 10 minutes to 48 hours.

5. The method according to claim 3, wherein the aluminum compound is obtainable by a procedure in which tungsten or the tungsten compound is added to a solution containing aluminum halides or aluminum salts in an amount of 0.1 to 5% by weight in terms of tungsten oxide based on alumina after calcination, intimately mixed and then neutralized, recrystallized or precipitated in the form of a carbonate salt by ammonium hydrogencarbonate.

6. The method according to claim 3, wherein the aluminum compound is obtainable by a procedure in which tungsten or the tungsten compound is added to a solution containing an organic aluminum compound in an amount of 0.1 to 5% by weight in terms of tungsten oxide based on alumina after calcination, intimately mixed, and subjected to hydrolysis.

7. The method according to claim 6, wherein the organic aluminum compound is at least one compound selected from the group consisting of an aluminum alkoxide, an atkylaluminum, an aluminum carboxylate salt and an aluminum dicarboxylate salt.

8. The method according to claim 3, wherein the aluminum compound is obtainable by a procedure in which tungsten or the tungsten compound is added to an aluminum-containing compound prepared by neutralizing, recrystallizing or precipitating only an aluminum salt, or an aluminum-containing compound prepared by subjecting only an organic aluminum compound to a hydrolysis or pyrolysis in an amount of 0.1 to 5% by weight in terms of tungsten oxide based on aluminum, and mixed in a dry or wet state.

* * * * *